US006681272B1

United States Patent
Anderson et al.

(12) United States Patent  
(10) Patent No.: US 6,681,272 B1  
(45) Date of Patent: *Jan. 20, 2004

(54) ELASTIC STORE CIRCUIT WITH STATIC PHASE OFFSET

(75) Inventors: Walker Edward Anderson, San Diego, CA (US); Thomas Gordon Palkert, Excelsior, MN (US); Robert S. Tepper, San Diego, CA (US)

(73) Assignee: Applied Micro Circuits Corporation, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/420,976

(22) Filed: Oct. 20, 1999

(51) Int. Cl.[7] .............................................. G06F 13/14
(52) U.S. Cl. ...................... 710/52; 713/400; 713/401; 375/375; 375/372
(58) Field of Search ........................... 710/52; 713/400, 713/401; 375/375, 372

(56) References Cited

U.S. PATENT DOCUMENTS

| | | | | |
|---|---|---|---|---|
| 4,327,411 A | | 4/1982 | Turner ........................ 364/900 |
| 4,600,945 A | * | 7/1986 | Bolger ........................ 358/160 |
| 5,015,970 A | | 5/1991 | Williams et al. .............. 331/11 |
| 5,260,940 A | | 11/1993 | Urbansky ..................... 370/84 |
| 5,394,106 A | | 2/1995 | Black et al. ................. 327/107 |
| 5,499,274 A | | 3/1996 | Brown ........................ 375/376 |
| 5,537,447 A | * | 7/1996 | Urbansky ..................... 375/372 |
| 5,699,391 A | | 12/1997 | Mazzurco et al. ........... 375/372 |
| 5,859,882 A | * | 1/1999 | Urbansky ..................... 375/375 |
| 5,999,580 A | * | 12/1999 | Sakoda et al. ............... 375/354 |
| 6,005,902 A | * | 12/1999 | Bortolini et al. ............. 375/356 |
| 6,067,304 A | * | 5/2000 | Nishioka ..................... 370/516 |
| 6,115,318 A | * | 9/2000 | Keeth ......................... 365/233 |
| 6,148,009 A | * | 11/2000 | Kim ........................... 370/506 |
| 6,236,695 B1 | * | 5/2001 | Tayler ........................ 375/372 |

* cited by examiner

Primary Examiner—Abdelmoniem Elamin  
(74) Attorney, Agent, or Firm—Incaplaw; Terrance A. Meador

(57) ABSTRACT

An elastic store circuit using a first in/first out buffer (FIFO) to accurately control the phase delay in a waveform using the write (WR) and read (RD) clocks is provided. The FIFO reads the input data at the WR clock rate. The data exits the FIFO in response to the RD clock. Large delays are accomplished by changing the relationship between the WR and RD clocks in whole clock intervals. Delays and adjustments of less than a whole clock interval are accomplished by changing the phase relationship of the RD clock with respect to the WR clock. The present invention generates the WR and RD clocks through synthesis using a lower frequency reference clock. The RD clock phase change results from phase-locking the RD clock to a phase offset version of the reference clock. A method of introducing precise delays through phase delay of the RD clock with respect to the reference clock is also provided.

22 Claims, 5 Drawing Sheets

ELASTIC STORE CIRCUIT WITH STATIC PHASE OFFSET

BACKGROUND AND SUMMARY OF THE INVENTION

This invention is generally related to integrated circuit (IC) signal timing circuitry and, more particularly, to a method of delaying signals through an elastic store for delay times incremented through phase control of the clocking signals.

An elastic store is a circuit often used in a receiver to acquire asynchronous input data, or to collect data from sources with unpredictable transmission delays. The elastic store can also be used to combine multiplexed data sources, or in the receiver channel of a cross-point switch. The elastic store receives data at uncertain clock rates and converts it to the receiver clock rate. Conventionally, the elastic store accepts data at a write (WR) clock rate, and supplies it at the read (RD) clock rate. Delay is added to the system by adjusting the number of clock cycles between when data is written, and when it is read.

Conventional elastic store circuits provide a delay of at least one clock cycle. These circuits are useful if large delays are required between the input and output data. However, problems arise in using elastic stores to create a delay of less than a clock cycle. Neither are conventional elastic stores useful if a delay equal to a non-integer value of a clock cycle is required, for example, a delay of 1.5 clock cycles. It is possible to add delay circuitry to the input or output data lines of the elastic store to achieve delays that are not an integer value of a clock cycle. However, keeping such delay circuitry synchronously aligned with the WR and RD clocks of the elastic store is a problem. Further, such delay circuitry is not readily available for high speed waveforms.

In co-pending patent application Ser. No. 09/420,983, entitled "ELASTIC STORE CIRCUIT WITH VERNIER CLOCK DELAY," filed on Oct. 20, 1999 still pending, Anderson et al. disclose a system of adding a vernier controlled delay to a reference clock, which results in elastic store delays of much less than a read or write clock cycle. The system delays the reference clock so that small delay increments can be added between the WR and RD clocks.

It would be advantageous if an elastic store could delay data for periods of time that are less than the WR and RD clock cycles to provide precise control over the timing of signals.

It would be advantageous if delays of less than a WR/RD clock cycle could be made programmable and repeatable.

It would be advantageous if elastic store delays of less than a read or write clock cycle could be controlled with the accuracy of phase-locking circuitry.

It would be advantageous if non-integer clock cycle delays could be maintained in a synchronous relationship to the WR and RD clocks.

It would be advantageous if an elastic store had the capacity to delay data signals for periods of time greater than a WR/RD clock cycle, simultaneously with the capacity to make adjustments that are in increments smaller than the period of a WR/RD clock.

Accordingly, an elastic store with programmable phase delay is provided. The elastic store comprises a static phase offset circuit to accept a reference clock, and a phase delay control signal. The static phase offset circuit has an output to provide a read (RD) clock, that is phase delayed with respect a write (WR) clock. The static phase offset circuit delays the RD clock in response to the phase delay control signal.

A first in/first out (FIFO) circuit has inputs to receive data input, the WR clock, and the RD clock. The FIFO output provides the data input at the FIFO output, delayed by a first delay, which corresponds to the difference between the phases of the WR and RD clocks. In this manner, the input signals are delayed in response to the clock signals.

The static phase offset circuit includes sub-circuits. A phase bias circuit accepts the frequency divided RD clock, called the null-phased reference compare reference signal. The phase bias circuit also accepts a phase delay control signal. An output provides a phase-biased reference compare signal. That is, the phase bias circuit cancels out, or offsets the phase bias associated with the phase-nulled references signal. The loop is locked with the RD clock having a phase offset with respect to the reference clock driving the WR clock.

A first clock synthesizer unit (CSU) receives the phase-biased reference compare signal, and outputs the RD clock. The first CSU varies the RD clock in response to the phase bias added to the reference clock. The first CSU includes sub-circuits. A first phase detector accepts the reference clock and the phase-biased reference compare signal, and provides a frequency source voltage. A frequency source accepts the frequency source voltage, and provides the RD clock. The elastic store also includes a second CSU to receive the reference clock, and provide the WR clock, phase-locked to the reference clock.

A method for precisely controlling the phase of input data in a data transfer is also provided comprising the steps of:

a) generating a reference clock;

b) generating a null-phased reference compare signal in response by offsetting the phase of the reference clock;

c) generating a write (WR) clock, phase-locked to the reference clock;

d) generating a read (RD) clock, statically delayed in phase with respect the WR clock, and phase-locked to the null-phased reference compare signal;

e) writing input data at the WR clock rate; and d) reading the input data at the RD clock rate, whereby an elastic store with a first delay corresponding to the phase difference of the WR and RD clocks is created.

DETAILED DESCRIPTION OF THE PREFERRED EMBODIMENT

Figure 1:
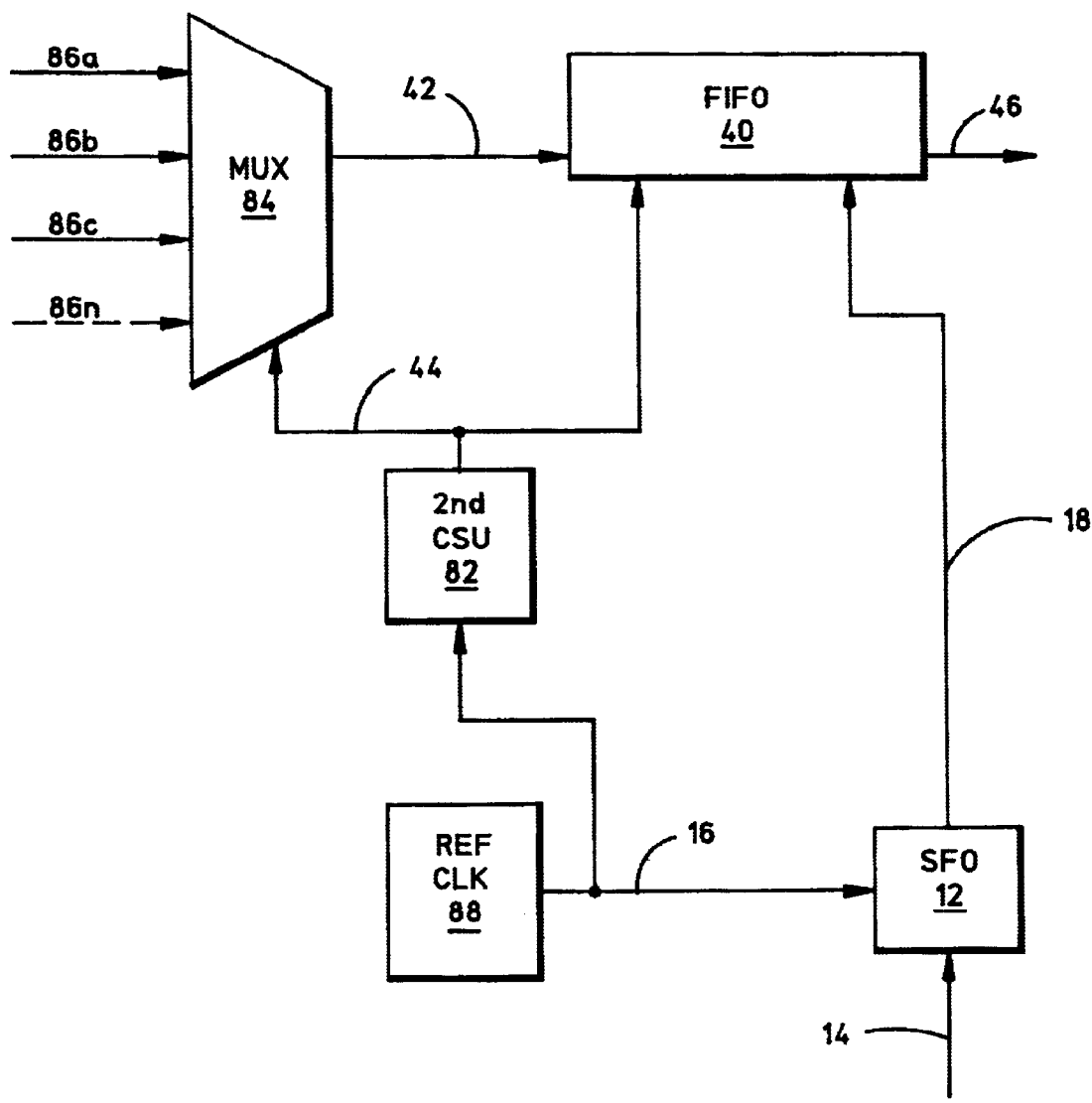
FIG. 1 is a schematic block diagram of the present invention elastic store with programmable phase delay.

FIG. 1 is a schematic block diagram of the present invention elastic store with programmable phase delay. Elastic store 10 comprises a static phase offset (SFO) circuit 12 having a first input on line 16 to accept a reference clock signal at a first frequency with a first phase. A second input on line 14 receives a phase delay control signal. An output on line 18 provides a read (RD) clock at a second frequency with a third phase, that is phase delayed with respect to a write (WR) clock. The WR clock appears on line 44 in FIG. 1. The WR clock operates at the second frequency with a second phase. Static phase offset circuit 12 varies the phase of the second frequency (RD clock) on line 18 in response to the phase delay control signal on line 14.

Figure 2:
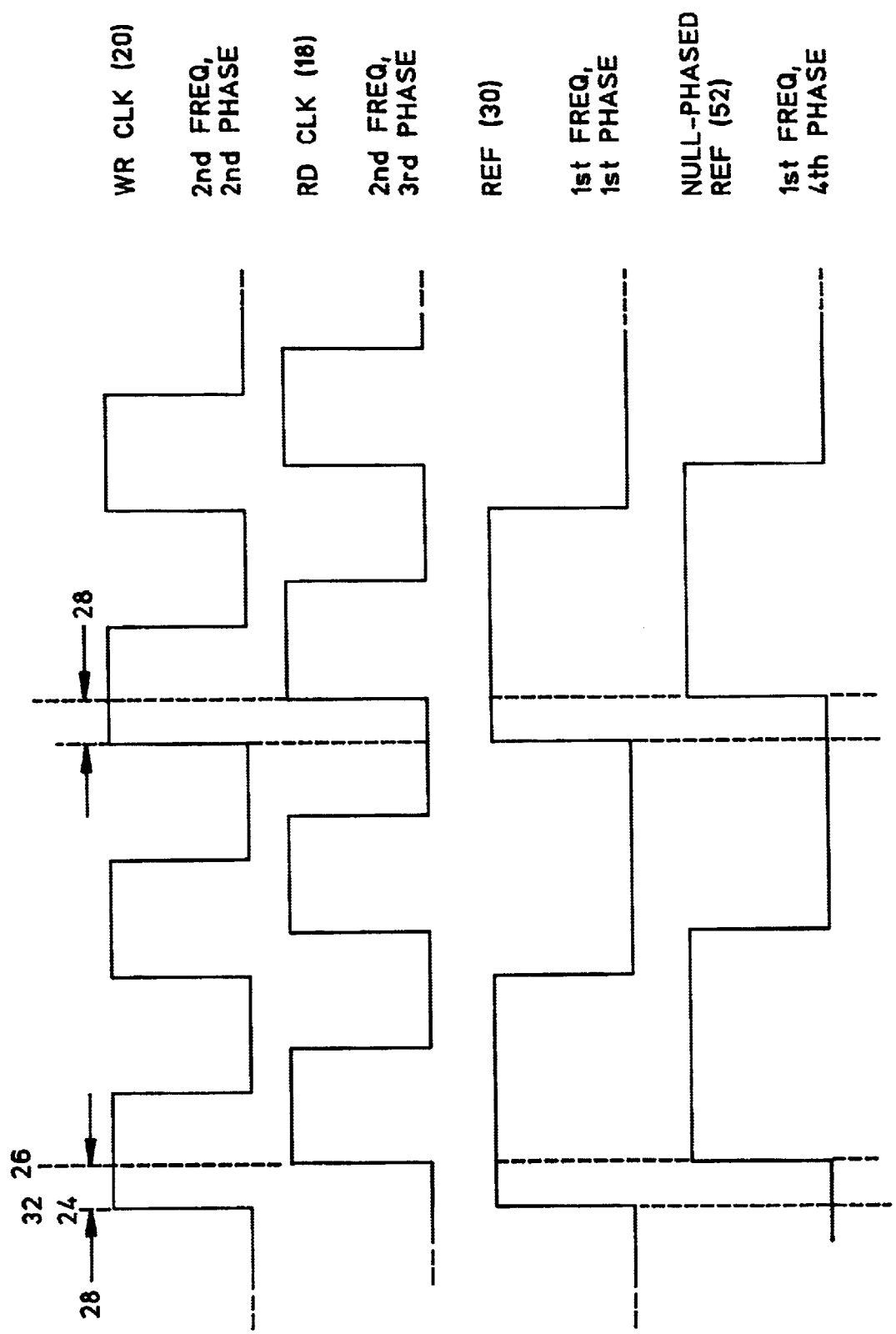
FIG. 2 is a timing diagram illustrating the differences between signal clocks in the elastic store of FIG. 1.

FIG. 2 is a timing diagram illustrating the differences between signal clocks in elastic store 10 of FIG. 1. WR clock 20 has a second frequency with a period equal to the time between rising clock pulses. RD clock 18 has the same second frequency and period as WR clock 20. However, the phases of WR clock 20 and RD clock 18 are not coincidentally aligned. For example, a rising pulse of WR clock 20 occurs at time 24, while a corresponding rising pulse of RD clock 18 occurs at time 26. The difference between time 24 and time 26 is a first time delay 28. Reference clock 30 has a rising edge at a time 32 that coincides with time 24 associated with WR clock 20. Although the first frequency of reference clock 30 is different that the second frequency of WR clock 20, each rising clock edge of reference clock 30 coincides with every other rising clock edge of WR clock 20. If reference clock 30 is used to generate WR clock 20, the two clocks can be considered phase-locked. In the example of FIG. 2, the second frequency is twice as large as the first frequency. However, the difference between the two phase-locked frequencies can be any multiple.

Returning to FIG. 1, a first in/first out (FIFO) circuit 40 has a first input on line 42 to receive data [input], and a second input on line 44 to accept the WR clock, which is phase-locked to the reference clock. FIFO 40 has a third input on line 18 to accept the RD clock, which is delayed in phase with respect to the WR clock. FIFO 40 has an output on line 46 to provide the data at the FIFO output, delayed by a first delay 28 (see FIG. 2), which represents the phase difference of the WR and RD clocks 20 and 18, respectively. In this manner, the input data is delayed in response to the clock signals. Typically, the difference between the second frequency second phase and second frequency third phase, also expressed as first delay 28, is less than 360 degrees, whereby the input signal first delay through said FIFO is finely adjusted.

Figure 3:
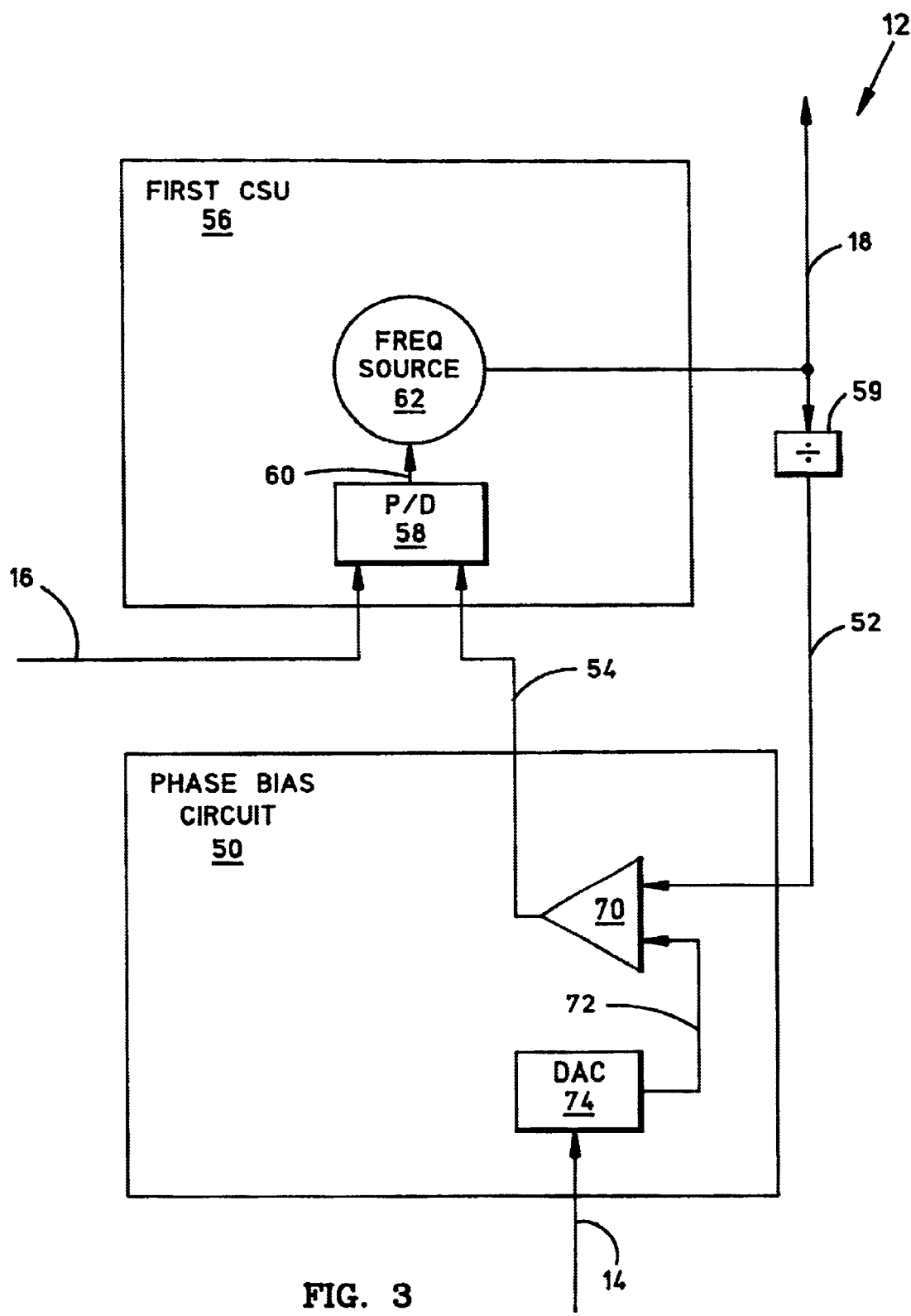
FIG. 3 is a detailed schematic block diagram depicting the static phase offset circuit of FIG. 1.

FIG. 3 is a detailed schematic block diagram depicting static phase offset circuit 12 of FIG. 1. Static phase offset circuit 12 comprises a phase bias circuit 50 having a first input on line 52 to accept a null-phased reference compare signal at the first frequency with a fourth phase, which is phase-locked to the RD clock (see FIG. 2). Phase bias circuit 50 has a second input to accept the phase delay control signal on line 14, and an output on line 54 to provide a phase-biased reference compare signal at the first frequency with the first phase.

Returning to FIG. 3, a first clock synthesizer unit (CSU) 56 has a first input operatively connected to the output of phase bias circuit 50 on line 54 to receive the phase-biased reference compare signal. First CSU 56 has an output on line 18 operatively connected to the third input of FIFO 40 to provide the RD clock. First CSU 56 varies the phase of the RD clock on line 18 in response to the phase delay signal on line 14.

First CSU 56 further comprises a first phase detector 58 having a first input on line 54 operatively connected to the output of phase bias circuit 50, to accept the phase-biased reference compare signal. Phase detector 58 has a second input on line 16 to accept the reference clock. Typically, the RD clock on line 18 is at a higher frequency than the first frequency and must be divided in frequency, by divider 59, before it is input into phase detector 58. Alternately, the first and second frequencies are the same, and the first frequency fourth phase is the same as the second frequency second phase. Phase detector 58 has an output on line 60 to provide a frequency source voltage.

A first frequency source 62 has an input on line 60 operatively connected to the output of first phase detector 58 to accept the frequency source voltage, and an output operatively connected to the first input of phase bias circuit 50 on line 52, and to the third input of FIFO 40 on line 18 to supply the RD clock. In this manner, the phase bias added to the reference clock is translated to the clocking frequency of FIFO 40.

Phase bias circuit 50 comprises a differential amplifier 70 having a first input on line 52 to accept the null-phased reference compare signal, and a second input on line 72 to accept the phase offset signal. Differential amplifier 70 has an output on line 54 operatively connected to the first input of phase detector 58 to provide the phase-biased reference compare signal. That is, differential amplifier 70 offsets the phase of the null-phased reference compare signal on line 52 to create the phase-biased reference compare signal. The titles of the signals are arbitrary, depending on the reference. The phase-biased reference compare signal is where the phase bias is entered into the loop. However, in locking the loop, the phase of phase-cancelled signal becomes substantially the same as the reference clock on line 16.

Phase bias circuit 50 also comprises a phase offset circuit 74 having an input on line 14 to accept the phase delay control signals. Phase offset circuit 74 has an output on line 72 operatively connected to the second input of differential amplifier 70 to provide the phase offset signal. In some aspects of the invention phase offset circuit 74 is a digital to analog converter (DAC) which outputs a dc voltage in response to digital commands. The addition of the dc voltage to the feedback signal on line 54 creates the phase bias in the loop.

As is well known in the art, there are many means of generating a phase bias in a phase-locked loop. The above-mentioned circuit is only one possible method of adding a phase delay to the RD clock. Alternately, the signal between phase detector 58 and frequency source 62 may be manipulated. Otherwise, the divisor of the frequency divider 59 is modified to generate a phase offset in the loop.

Returning to FIG. 1, elastic store 10 further comprises a second CSU having a first input on line 16 to receive the reference clock. Second CSU 82 has an output on line 44 operatively connected to the second input of FIFO 40 to provide the WR clock, phase-locked to the reference clock on line 16.

A multiplexer (MUX) circuit 84 has a first plurality of inputs on lines 86a 86b 86c and 86n to accept a first plurality of data input signals. MUX 84 has a second input on line 44 operatively connected to the output of second CSU 82 to accept the WR clock as control signals. MUX 84 has an output operatively connected to the first input of FIFO 40 on line 42 to provide a multiplex of the first plurality of data input signals clocked at the rate of the WR clock in response to the control signals on line 44.

A reference clock 88 has an output on line 16 operatively connected to provide the reference clock signal to the input of static phase offset circuit 12, and to the input of second CSU 82.

Figure 4:
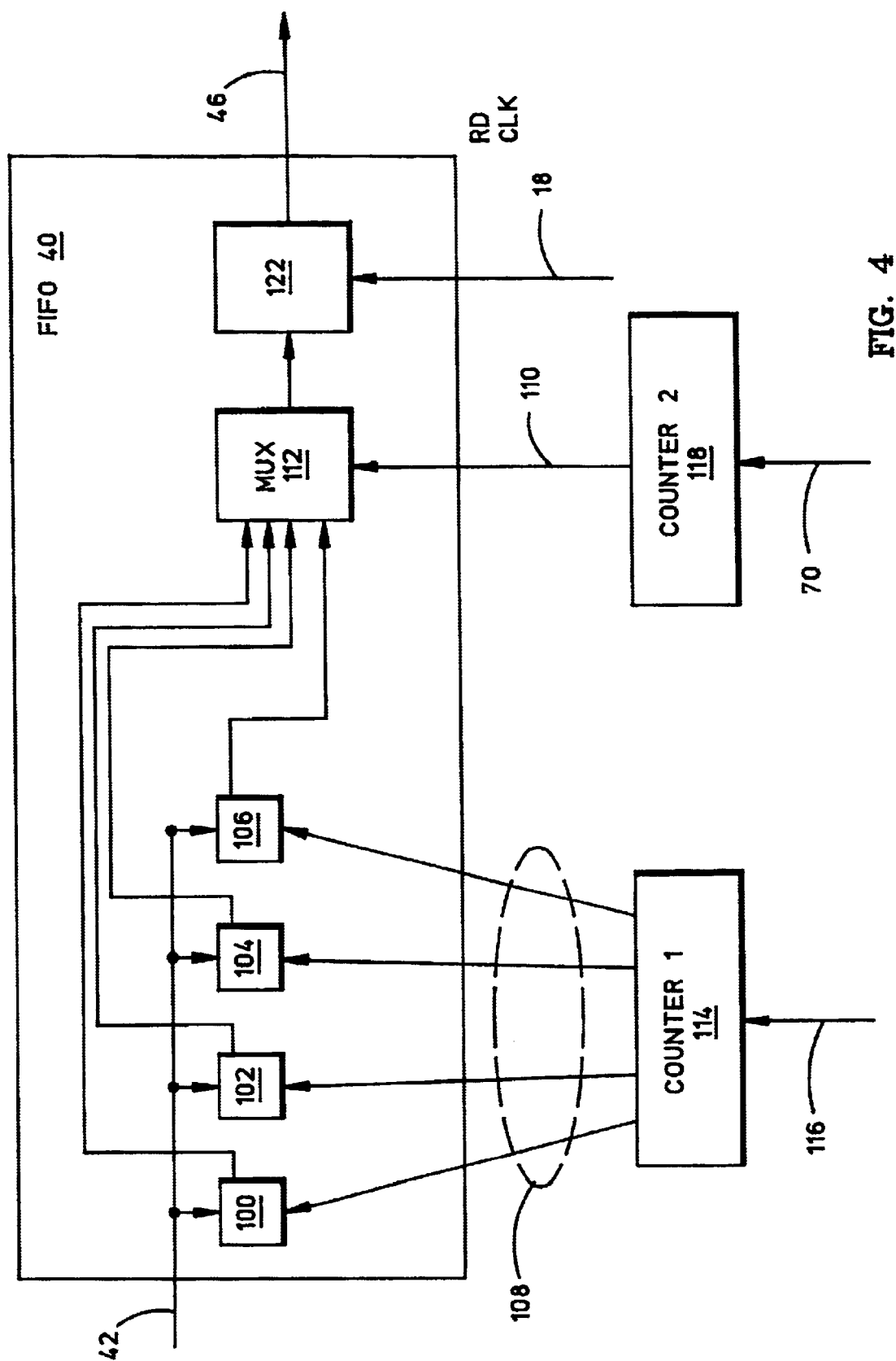
FIG. 4 is a detailed schematic block diagram of the FIFO of FIG. 1.

FIG. 4 is a detailed schematic block diagram of FIFO 40 of FIG. 1. FIFO 40 includes a plurality of registers to store input data. FIG. 4 depicts registers 100, 102, 104, and 106, however, the present invention system is applicable to any number of registers. A fourth input on line(s) 108 accepts control signals which select which of registers 100, 102, 104, and 106 are written upon initialization of FIFO 40. In some aspects of the invention the registers are flip-flops, although the input data can be stored using alternate means. Four control signals are depicted in connection with line 108, however, communication may be serial in a single line. Further, as is well understood in the art, all the input lines to and from FIFO 40 are data/address buses in some aspects of the invention. A fifth input on line 110 accepts control signals to select which register is read upon initialization. A MUX type circuit 112 is shown to accomplish the register read function. However, numerous other methods may be used to select which data bits are to be read and output on line 46.

The control circuitry on line 108 selects which of registers 100, 102, 104, and 106 is written, or loaded upon initialization of FIFO 100. After initialization, data is written in a periodic order. For example, if register 2 (102) is selected at initialization, the data is written into register 2 (102), then register 3 (104), register 4 (106), register 1 (100), and returning to register 2 (102) in a cyclical, continuing pattern advanced by the WR clock (not shown). Likewise, the data is read in a periodic pattern starting with the register selected upon initialization with the control line 110. In this manner, a predetermined number of clock cycle delays are programmed between the reading of data and the writing of data, so that a coarse delay is programmable. Typically, FIFO 40 has a latency of at least one second frequency clock cycle between receiving the input data at the first input on line 42 and providing the data at the output on line 46.

A first counter, or divider circuit 114 has a first input on line 116 to accept initialization commands to program the state of first counter 114 upon initialization, and an output on line 108 operatively connected to the fourth input of FIFO 40 to select which of registers 100, 102, 104, and 106 is initially-written. By making counter 114 programmable, the same registers are written and read upon initialization, and the same timing relationships are maintained. Counter 114 may include flip-flops and AND gates to accomplish the selection function as is well known. A second counter, or divider 118 has a first input on line 120 to accept initialization commands to program the state of second counter 118 upon initialization, and an output on line 110 operatively connected to the fifth input of FIFO 40 to select which register is initially read. In this manner, a coarse delay of at least one WR clock cycle is introduced into data signals at the output on line 46 of FIFO 40. An output register 122 is operatively connected to the output of MUX 112. The output is reclocked through output register 122 by the RD clock on line 18 for greater timing control. In some aspects of the invention (not shown), FIFO 40 includes first and second counters 114 and 118, whereby coarse adjustments are made with initialization commands on lines 66 and 70 to FIFO 40.

The present invention was developed out of the need to both control relatively high speed data flow, and to more precisely delay the waveforms of these data streams. In some aspects of the invention the second frequency is greater than approximately 1.0 gigahertz (GHz), and the first frequency is in the range of approximately 10 and 400 MHz. Further, although not critical to the invention, the second frequency is approximately four times as great as the first frequency, or greater.

Figure 5:
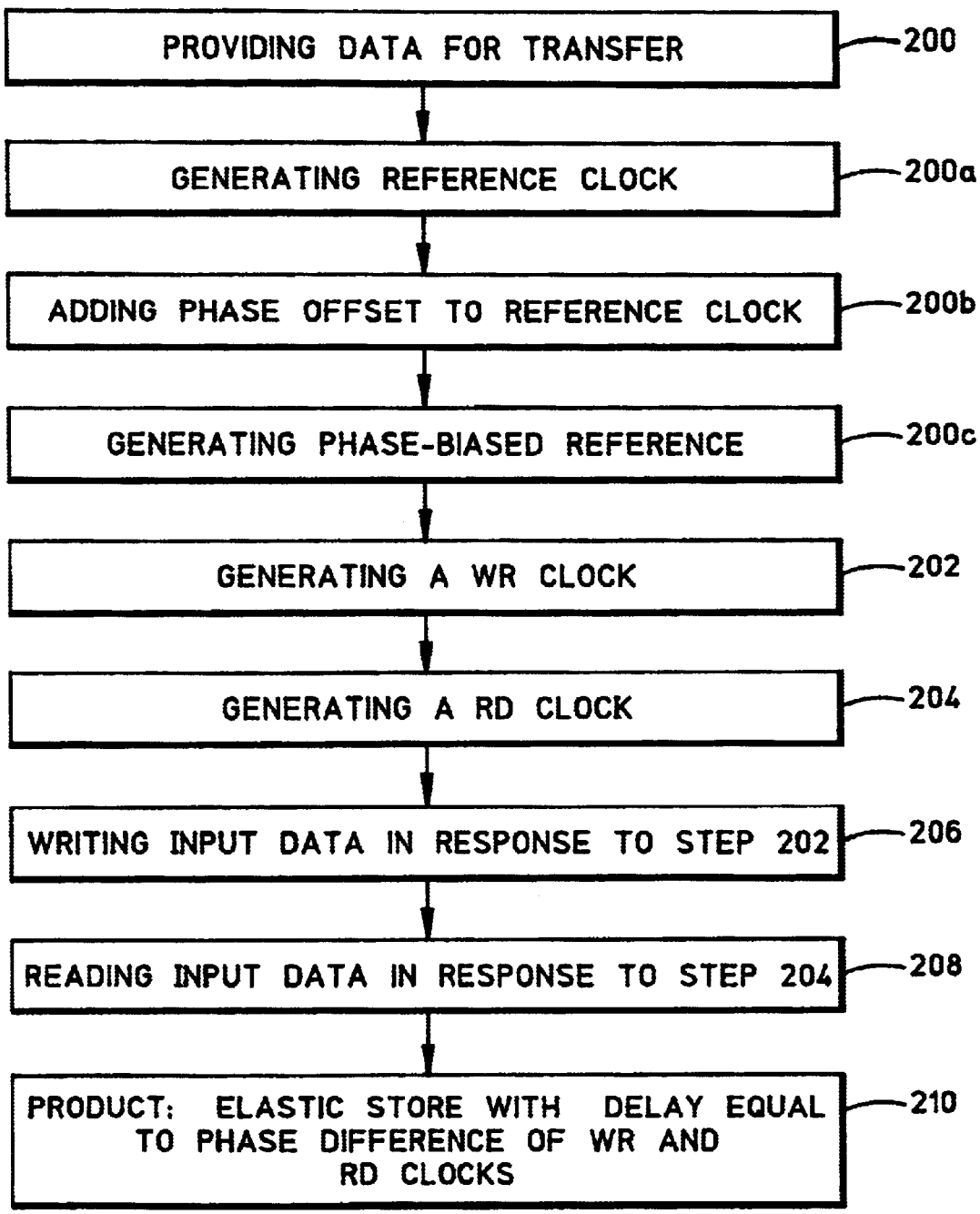
FIG. 5 is a flowchart illustrating steps in a method for precisely controlling the phase of input data in a data transfer.

FIG. 5 is a flowchart illustrating steps in a method for precisely controlling the phase of input data in a data transfer. In some aspects of the invention a first-in/first-out transferred process is used. Step 200 provides input data to be transferred. Step 202 generates a write (WR) clock having a second frequency with a second phase (see FIG. 2). Step 204 generates a read (RD) clock having the second frequency with a third phase, statically delayed in phase with respect the second frequency with the second phase. Step 206 writes input data at the WR clock rate of Step 202. Step 208 reads the input data at the RD clock rate of Step 204. Step 210 is a product, where an elastic store with a first delay, corresponding to the phase difference of the WR and RD clocks, is created.

In some aspects of the invention further steps precede Step 202. Step 200a generates a reference clock having a first frequency with a first phase. Step 200b generates a null-phased reference compare signal at the first frequency with a fourth delay in response to the reference clock of Step 200a. That is, a phase bias is added to the reference clock. Then, Step 202 includes phase-locking the WR clock to the reference clock of Step 200a, and Step 204 includes the RD clock being phase-locked to the null-phased reference compare signal of Step 200b.

In some aspects of the invention, Step 200 provides a plurality of storage registers. Then, further steps precede Step 206. Step 204a selects which register is initially written in Step 206. Step 204b selects which register is initially read in Step 208, whereby the number of clock intervals between initial write and read registers represents a second delay. Step 208 includes reading the input data from the plurality of storage registers, beginning with the register selected in Step 204b, whereby a coarse delay is added to the elastic store. Step 208 includes the second delay being equal to the number of clock cycles occurring between the writing of a first data in Step 206 and the reading of the first data in Step 208.

Optionally, other steps precede Step 206. Step 204c receives a plurality of parallel input data signals, and Step 204d multiplexes the parallel input data signals at the rate of the WT clock to generate the input data, whereby the timing of a multiplexed data source is controlled.

In some aspects of the invention, Step 200 provides a MUX having a plurality of parallel data inputs, a second input to accept control signals, and an output to provide a multiplex of the plurality of parallel data inputs. Then, Step 204c includes receiving the plurality of parallel data inputs at the plurality of MUX data inputs, and Step 204d includes providing the multiplex of the data inputs at the MUX output in response to WR clock signals at the MUX second input.

In other aspects of the invention, Step 200 provides a static phase offset circuit having a first input to accept a frequency input, a second input to accept control signals, and an output to provide an output frequency with a phase bias in response to the control signals. Then, Step 204 includes the static phase offset circuit accepting the reference clock at the first input, accepting the phase delay control signals at the second input, and providing the RD clock at the output.

In some aspects of the invention Step 200 provides a phase bias circuit having a first input to accept a frequency, and second input to accept commands, and an output to provide the input frequency with a phase bias responsive to the commands. Further, Step 200 provides a first clock synthesis unit (CSU) having an input to accept an input frequency, and an output to provide an output frequency, phase-locked to the input frequency. A further step follows Step 200b. Step 200c inputs the null-phased reference compare signal of Step 200b into the first input of the phase bias circuit to generate a phase-biased reference compare signal at the output, in response to the phase delay signal at the second input. Then, Step 204 includes inputting the phase-biased reference compare signal into the input of the first CSU to generate the RD clock at the first CSU output.

In some aspects of the invention, Step 200 provides a second CSU having an input to accept an input frequency, and an output to provide an output frequency phase-locked to the input frequency. Then, Step 202 includes inputting the reference clock at the input of the second CSU, and generating the WR clock at the output.

A system and method of using an elastic store, or FIFO to accurately phase delay and manipulate a waveform using the WR and RD clocks as been provided. The FIFO delays data by first reading the input data at the WR clock rate. The data exits the FIFO in response to the RD clock. Large delays are accomplished by changing the relationship between the WR and RD clocks in whole clock intervals. Delays and adjustments of less than a whole clock interval are accomplished by changing the phase relationship of the RD clock with respect to the reference clock of the system. The present invention generates the WR and RD clocks through synthesis using a lower frequency reference clock. The RD phase change results from phase-locking the RD clock to a phase delayed version of the reference clock. Other variations and embodiments of the present invention will occur to those skilled in the art.

What is claimed is:

1. An elastic store with programmable phase delay comprising:

a static phase offset circuit having a first input to accept a reference clock having a first frequency and a first phase, a second input to receive a phase delay control signal, and an output to provide a read (RD) clock having a second frequency and a third phase, the RD clock being phase delayed with respect to a write (WR) clock having the second frequency and a second phase, said static phase offset circuit varying the third phase of the RD clock in response to the phase delay control signal;

a first in/first out (FIFO) circuit having a first input to receive input data, a second input to accept the WR clock, a third input to accept the RD clock, and an output to provide the input data at the FIFO output, delayed by a first delay corresponding to the difference of the second phase of the WR clock and the third phase of the RD clock, whereby the input data is delayed in response to the WR clock and the RD clock;

a phase bias circuit having a first input to accept a null-phased reference compare signal having the first frequency and a fourth phase, which is phase-locked to the RD clock, said phase bias circuit having a second input to accept the phase delay control signal, and an output to, provide a phase-biased reference compare signal having the first frequency and the first phase; and a first clock synthesizer unit (CSU) having a first input operatively connected to the output of said phase bias circuit to receive the phase-biased reference compare signal, said first CSU having an output operatively connected to the third input of said FIFO circuit to provide the RD clock, said first CSU varying the third phase of the RD clock in response to the phase delay control signal.

2. The elastic store of claim 1 in which said first CSU further comprises:

a phase detector having a first input operatively connected to the output of said phase bias circuit to accept the phase-biased reference compare signal, a second input to accept the reference clock, and an output to provide a frequency source voltage; and a frequency source having an input operatively connected to the output of said phase detector to accept the frequency source voltage, and an output operatively connected to the first input of said phase bias circuit, and to the third input of said FIFO circuit to supply the RD clock, whereby phase bias added to the reference clock is translated to a clocking frequency of the FIFO circuit.

3. The elastic store of claim 2 in which said phase bias circuit further comprises:

a differential amplifier having a first input operatively connected to the output of said frequency source to accept the null-phased reference compare signal, and a second input to accept a phase offset signal, said differential amplifier having an output operatively connected to the first input of said phase detector to provide the phase-biased reference compare signal, whereby phase bias is added to a loop; and a phase offset circuit having an input to receive the phase delay control signal, and an output operatively connected to the second input of said differential amplifier to provide the phase offset signal.

4. The elastic store of claim 1 further comprising:

a second CSU having an input to receive the reference clock, and an output operatively connected to the second input of said FIFO circuit to provide the WR clock, phase-locked to the reference clock.

5. The elastic store of claim 4 further comprising:

a multiplexer (MUX) circuit having a first plurality of inputs to accept a first plurality of data input signals, said MUX having a second input operatively connected to the output of said second CSU to accept the WR clock as a control signal, and an output operatively connected to the first input of said FIFO circuit to provide a multiplex of the first plurality of data input signals clocked at the rate of the WR clock in response to the control signal.

6. The elastic store of claim 5 further comprising:

a reference clock generator having an output operatively connected to provide the reference clock to the first input of said static phase offset circuit, and to the input of said second CSU.

7. The elastic store of claim 1 in which said FIFO circuit includes a plurality of registers to store data, a fourth input to accept control signals to select which register is written, upon initialization of said FIFO circuit, and a fifth input to accept control signals to select which register is read, upon initialization, the elastic store further comprising:

a first counter having a first input to accept initialization commands to program an initial state of said first counter upon initialization, and an output operatively connected to the fourth input of said FIFO circuit to select which register is initially written; and a second counter having a first input to accept initialization commands to program an initial state of said second counter upon initialization, and an output operatively connected to the fifth input of said FIFO circuit to select which register is initially read, whereby a coarse delay is introduced into data signals at the output of said FIFO circuit.

8. The elastic store of claim 7 in which said FIFO circuit includes said first and second counters, whereby coarse adjustments are made with initialization commands to said FIFO circuit.

9. The elastic store of claim 7 in which said FIFO circuit has a latency of at least one second frequency clock cycle, between receiving the input data at the first input of the FIFO circuit and providing the data at the output of the FIFO circuit.

10. The elastic store as in claim 1 wherein the second frequency is greater than approximately 1.0 gigahertz (GHz), and the first frequency is in the range of approximately 10 and 400 MHz.

11. The elastic store as in claim 1 wherein the second frequency is approximately four times as great as the first frequency, or greater.

12. The elastic store of claim 1 in which said first delay is less than 360 degrees, whereby the delay through said FIFO circuit is finely adjusted.

13. A method for precisely controlling the phase of input data in a first in/first out (FIFO) data transfer comprising the steps of:
   providing a phase bias circuit having a first input to accept an input frequency, a second input to accept commands, and an output to provide the input frequency with a phase bias responsive to the commands;
   providing a first clock synthesis unit (CSU) having an input to accept a CSU input frequency, and an output to provide a CSU output frequency, phase-locked to the CSU input frequency;
   generating a reference clock having a first frequency and a first phase;
   adding a phase bias to the reference clock to generate a null-phased reference compare signal having the first frequency and a fourth phase;
   inputting the null-phased reference compare signal into the first input of the phase bias circuit to generate a phase-biased reference compare signal at the output of the phase bias circuit in response to a phase delay control signal at the second input of the phase bias circuit;
   followed by,
      a) generating a write (WR) clock having a second frequency and a second phase, and phase-locking the WR clock to the reference clock;
      b) inputting the phase-biased reference compare signal at the input of the first CSU to generate a read (RD) clock at the output of the first CSU, the RD clock having the second frequency and a third phase, the RD clock being statically delayed in phase with respect to the WR clock and phase-locked to the null-phased reference compare signal;
      c) writing input data in response to the WR clock; and
      d) reading the input data in response to the RD clock, whereby an elastic store first delay is created corresponding to the difference of the second phase of the WR clock and the third phase of the RD clock.

14. The method of claim 13 wherein a plurality of storage registers are provided, and including further steps, preceding Step c), of:
   b1) selecting which register is initially written in Step c);
   b2) selecting which register is initially read in Step d), whereby the interval between initial write and read registers represents a second delay; and
      in which Step d) includes reading the input data from the plurality of storage registers, beginning with the register selected in Step b2), whereby a coarse delay is added to the elastic store.

15. The method as in claim 14 in which the second delay is equal to the number of clock cycles occurring between the writing of a first data in Step c) and the reading of the first data in Step d).

16. The method as in claim 13 further comprising steps, preceding Step c), of:
   b3) receiving a plurality of parallel input data signals; and
   b4) multiplexing the parallel input data signals at the rate of the WR clock to generate the input data, whereby the timing of a multiplexed data source is controlled.

17. The method of claim 16 wherein a MUX is provided having a plurality of parallel data inputs, a second input to accept control signals, and an output to provide a multiplex of the plurality of parallel input data signals, in which Step b3) includes receiving the plurality of parallel input data signals at the plurality of parallel data inputs, and in which Step b4) includes providing the multiplex of the plurality of parallel input data signals at the output of the MUX in response to WR clock signals at the second input of the MUX.

18. The method as in claim 13 wherein a static phase offset circuit is provided having a first input to accept a frequency input, a second input to accept control signals, and an output to provide an output frequency with a phase bias in response to the control signals, and in which Step b) includes accepting the reference clock at the first input of the static phase offset circuit, accepting the phase delay control signal at the second input of the static phase offset circuit, and providing the RD clock at the output of the static phase offset circuit.

19. The method as in claim 13 wherein a second CSU is provided having an input to accept a second CSU input frequency, and an output to provide a second CSU output frequency phase-locked to the second CSU input frequency, and in which Step a) includes putting the reference clock at the input of the second CSU, and generating the WR clock at the output of the second CSU.

20. The method of claim 13 in which the second frequency of Step a) is greater than approximately 1.0 gigahertz (GHz), and in which the first frequency of Step a1) is in the range of approximately 10 and 400 MHz.

21. The method of claim 13 in which the second frequency of the WR clock is approximately four times as great as the first frequency of the reference clock, or greater.

22. An elastic store with programmable phase delay comprising:
   a reference clock generator having an output to provide a reference clock signal having a first frequency and a first phase;
   a phase bias circuit having a first input to accept a null-phased reference compare signal having the first frequency and a fourth phase, a second input to accept a phase delay control signal, and an output to provide a phase-biased reference compare signal having the first frequency and the first phase;
   a first clock synthesizer unit (CSU) having a first input connected to the output of said phase bias circuit to receive the phase-biased reference compare signal, a second input to receive the reference clock signal, and an output to provide a read (RD) clock having a third phase that is phase-locked to the null-phased reference compare signal, whereby said first CSU varies the third phase of the RD clock in response to the phase delay control signal;
   a second CSU having a first input connected to the output of said reference clock generator, and an output to provide a write (WR) clock that is phase-locked to the reference clock signal; and
   a first in/first out (FIFO) circuit having a first input to receive input data, a second input connected to the output of the second CSU to accept the WR clock, a third input connected to the output of the first CSU to accept the RD clock, and an output to provide the input data in response to the RD clock; wherein
   the RD clock is delayed in phase with respect to the WR clock, and the input data is delayed by a precise amount of clock phase.

* * * * *